(12) United States Patent
Delinocci

(10) Patent No.: US 10,491,455 B2
(45) Date of Patent: *Nov. 26, 2019

(54) AUTOMATED ELECTRONICS COMPUTING AND COMMUNICATION SYSTEM EVENT ANALYSIS AND MANAGEMENT

(71) Applicant: ServiceNow, Inc., Santa Clara, CA (US)

(72) Inventor: John Delinocci, Atlanta, GA (US)

(73) Assignee: ServiceNow, Inc., Santa Clara, CA (US)

(*) Notice: Subject to any disclaimer, the term of this patent is extended or adjusted under 35 U.S.C. 154(b) by 165 days.

This patent is subject to a terminal disclaimer.

(21) Appl. No.: 15/682,314

(22) Filed: Aug. 21, 2017

(65) Prior Publication Data

US 2017/0346674 A1 Nov. 30, 2017

Related U.S. Application Data

(63) Continuation of application No. 14/824,143, filed on Aug. 12, 2015, now Pat. No. 9,742,625.

(51) Int. Cl.
*G06F 15/16* (2006.01)
*H04L 12/24* (2006.01)
(Continued)

(52) U.S. Cl.
CPC ........... *H04L 41/065* (2013.01); *G06F 21/52* (2013.01); *H04L 41/0654* (2013.01);
(Continued)

(58) Field of Classification Search
CPC ... H04L 41/065; H04L 41/0654; H04L 41/12; H04L 41/22; G06F 21/52; G06F 21/577
See application file for complete search history.

(56) References Cited

U.S. PATENT DOCUMENTS 132,260 A 10/1872 Duclos
5,978,594 A 11/1999 Bonnell
(Continued)

FOREIGN PATENT DOCUMENTS

EP 1041487 10/2000

OTHER PUBLICATIONS

IBM Software, "Preventing Network Outages With IBM Netcool Network Management", Solution Brief, Nov. 2012. http://!public.dhe.ibm.com/common/ssi/ecm/tilen/tis14136usen/TIS14136USEN.PDF, 6 pp.
(Continued)

*Primary Examiner* — Moustafa M Meky
(74) *Attorney, Agent, or Firm* — Fletcher Yoder PC

(57) ABSTRACT

Systems, apparatuses, and methods for automatic automated electronic computing and communication system event analysis and management are disclosed. Automatic automated electronic computing and communication system event analysis and management may include identifying an event, generating a computer readable representation of the electronic computing and communication system using automated topology enumeration, identifying an element of the electronic computing and communication system based on the representation, identifying a metric for the element, automatically investigating to determine a value for the metric, generating a remediation priority for the element based on a metric weight associated with the metric and a network layer value associated with a network layer associated with a network layer role associated with the element, and generating a graphical representation of the electronic computing and communication system indicating the remediation priority.

20 Claims, 6 Drawing Sheets

(51) Int. Cl.
*G06F 21/52* (2013.01)
*G06F 21/57* (2013.01)

(52) U.S. Cl.
CPC ............ *G06F 21/577* (2013.01); *H04L 41/12* (2013.01); *H04L 41/22* (2013.01)

(56) References Cited

U.S. PATENT DOCUMENTS

| | | |
|---|---|---|
| 6,321,229 B1 | 11/2001 | Goldman |
| 6,816,898 B1 | 11/2004 | Scarpelli |
| 7,027,411 B1 | 4/2006 | Pulsipher |
| 7,062,683 B2 | 6/2006 | Warpenburg |
| 7,392,300 B2 | 6/2008 | Anantharangachar |
| 7,475,133 B2 | 1/2009 | Nuggehalli |
| 7,489,639 B2 | 2/2009 | Breitgand et al. |
| 7,610,512 B2 | 10/2009 | Gerger |
| 7,617,073 B2 | 11/2009 | Trinon |
| 7,694,115 B1 | 4/2010 | Porras et al. |
| 7,877,783 B1 | 1/2011 | Cline |
| 7,890,802 B2 | 2/2011 | Gerber |
| 7,945,860 B2 | 5/2011 | Vambenepe |
| 7,966,398 B2 | 6/2011 | Wiles |
| 8,015,139 B2 | 9/2011 | Bahl et al. |
| 8,073,721 B1 | 12/2011 | Lewis |
| 8,095,648 B2 | 1/2012 | Macleod et al. |
| 8,132,260 B1 | 3/2012 | Mayer et al. |
| 8,171,344 B2 | 5/2012 | Watanabe |
| 8,224,683 B2 | 7/2012 | Manos |
| 8,443,074 B2 | 5/2013 | Bahl et al. |
| 8,554,750 B2 | 10/2013 | Rangaranjan |
| 8,674,992 B2 | 3/2014 | Poston |
| 9,069,749 B1 | 6/2015 | Rumsby |
| 9,191,296 B2* | 11/2015 | Dinger .................. H04L 41/069 |
| 9,239,988 B2* | 1/2016 | Dinger .................. H04L 41/069 |
| 9,369,481 B2* | 6/2016 | Howes .................. G06Q 10/10 |
| 9,742,625 B2* | 8/2017 | Delinocci ............. H04L 41/065 |
| 9,830,458 B2* | 11/2017 | McBride ............... G06F 21/577 |
| 2002/0032769 A1 | 3/2002 | Barkai et al. |
| 2002/0111755 A1 | 8/2002 | Valadarsky et al. |
| 2005/0157654 A1 | 7/2005 | Farrell et al. |
| 2006/0047809 A1 | 3/2006 | Slattery et al. |
| 2011/0016355 A1* | 1/2011 | Watanabe ........... G06F 11/2257 714/37 |
| 2011/0282508 A1* | 11/2011 | Goutard .................... H02J 3/06 700/293 |
| 2013/0091574 A1* | 4/2013 | Howes .................. G06Q 10/10 726/24 |
| 2013/0166745 A1* | 6/2013 | Dinger .................. H04L 41/069 709/224 |
| 2013/0250779 A1 | 9/2013 | Meloche |
| 2014/0137257 A1 | 5/2014 | Martinez et al. |
| 2014/0223567 A1* | 8/2014 | Howes .................. G06Q 10/10 726/25 |
| 2014/0237545 A1 | 8/2014 | Mylavarapu et al. |
| 2015/0032888 A1* | 1/2015 | Dinger ..................... G06N 5/04 709/224 |
| 2015/0310215 A1* | 10/2015 | McBride ............... G06F 21/577 726/25 |
| 2016/0149985 A1 | 5/2016 | Meloche |
| 2017/0026401 A1* | 1/2017 | Polyakov ............ H04L 63/1433 |

OTHER PUBLICATIONS

Branch Office Blackout, "WAN Monitoring Whitepaper", https://WVvW.manageengine.com/network-monitoring/wan-white-paper.pdf, Date Unknown, 6 pp.

Zobel, Daniel, "Monitoring Applications and Services With Network Monitoring", White Paper, PRTG Network Monitor, Dec. 2013, 8 pp.

* cited by examiner

AUTOMATED ELECTRONICS COMPUTING AND COMMUNICATION SYSTEM EVENT ANALYSIS AND MANAGEMENT

CROSS-REFERENCE TO RELATED APPLICATIONS

This application is a continuation of U.S. patent application Ser. No. 14/824,143, entitled "AUTOMATED ELECTRONIC COMPUTING AND COMMUNICATION SYSTEM EVENT ANALYSIS AND MANAGEMENT," filed on Aug. 12, 2015, which is incorporated in its entirety for all purposes.

TECHNICAL FIELD

The present disclosure is generally related to information technology, and in particular to computer-implemented methods, systems, and apparatuses to analyze events occurring in an electronic computing and communication system.

BACKGROUND

An electronic computing and communication system may include one or more communicating and computing elements, which may, in the course of communicating and computing, generate event information, which may indicate an abnormal operating condition, such as a failure, which may affect one or more elements of the electronic computing and communication system, such as a service. Accordingly, a method and apparatus for automated electronic computing and communication system event analysis and management may be advantageous.

SUMMARY

One aspect of the disclosure is a method of automatically analyzing an electronic computing and communication system event. Automatically analyzing an electronic computing and communication system event may include identifying information indicating an event in an electronic computing and communication system, generating a computer readable representation of the electronic computing and communication system using automated topology enumeration, wherein the computer readable representation represents a plurality of elements of the electronic computing and communication system organized in a hierarchical plurality of network layers, identifying an element of the electronic computing and communication system from plurality of elements based on the computer readable representation of the electronic computing and communication system, identifying a metric for the element of the electronic computing and communication system, and automatically investigating the electronic computing and communication system to determine a value for the metric for the element of the electronic computing and communication system. On a condition that the value is an abnormal value, automatically analyzing an electronic computing and communication system event may include generating a remediation priority for the element of the electronic computing and communication system based on a metric weight associated with the metric and a network layer value associated with a network layer from the hierarchical plurality of network layers, wherein the element is associated with a network layer role corresponding to the network layer. Automatically analyzing an electronic computing and communication system event generating a graphical representation of the electronic computing and communication system, the graphical representation indicating the remediation priority, and outputting or storing the representation.

Another aspect of the disclosure is a method of automatically analyzing an electronic computing and communication system event. Automatically analyzing an electronic computing and communication system event may include identifying information indicating an event in an electronic computing and communication system, generating a computer readable representation of the electronic computing and communication system using automated topology enumeration, wherein the computer readable representation represents a plurality of elements of the electronic computing and communication system organized in a hierarchical plurality of network layers, wherein each respective element from the plurality of elements is associated with a respective network layer role corresponding to a respective network layer, identifying a set of elements of the electronic computing and communication system from plurality of elements based on the computer readable representation of the electronic computing and communication system, identifying a plurality of metrics, wherein each element from the set of elements is associated with at least one respective metric from the plurality of metrics, automatically investigating the electronic computing and communication system to determine a plurality of values, wherein each value from the plurality of values corresponds with a respective metric from the plurality of metrics and a respective element from the set of elements, generating a plurality of remediation priorities, wherein each remediation priority from the plurality of remediation priorities corresponds with a respective value from the plurality of values, a respective metric from the plurality of metrics, and a respective element from the set of elements, and wherein each remediation priority from the plurality of remediation priorities is based on a metric weight associated with the respective corresponding metric and a network layer value associated with a respective network layer associated with a respective network layer role associated with the respective element, generating a graphical representation of the electronic computing and communication system, the graphical representation indicating at least some of the remediation priorities, and outputting or storing the representation.

Another aspect of the disclosure is a method of automatically analyzing an electronic computing and communication system event. Automatically analyzing an electronic computing and communication system event may include identifying information indicating an event in an electronic computing and communication system, wherein the event is associated with a service, generating a computer readable representation of the electronic computing and communication system using automated topology enumeration, wherein the computer readable representation represents a plurality of elements of the electronic computing and communication system organized in a hierarchical plurality of network layers, wherein each respective element from the plurality of elements is associated with a respective network layer role corresponding to a respective network layer, identifying a set of elements of the electronic computing and communication system from plurality of elements based on the computer readable representation of the electronic computing and communication system, identifying a plurality of metrics, wherein each element from the set of elements is associated with at least one respective metric from the plurality of metrics, automatically investigating the electronic computing and communication system to determine a plurality of values, wherein each value from the plurality of values corresponds with a respective metric from the plurality of metrics and a respective element from the set of elements, generating a plurality of remediation priorities, wherein each remediation priority from the plurality of remediation priorities corresponds with a respective value from the plurality of values, a respective metric from the plurality of metrics, and a respective element from the set of elements, and wherein each remediation priority from the plurality of remediation priorities is based on a metric weight associated with the respective corresponding metric and a network layer value associated with a respective network layer associated with a respective network layer role associated with the respective element, and generating a graphical representation of the electronic computing and communication system. Generating the graphical representation may include generating a graphical representation of the hierarchical plurality of network layers, wherein the service corresponds with a network layer from the hierarchical plurality of network layers, and for each element from the set of elements, generating a graphical representation of the element, and, on a condition that a value from the plurality of values corresponding to the element is an abnormal value, generating a graphical representation indicating that the value is an abnormal value and indicating a category associated with a metric from the plurality of metrics associated with the value. Generating the graphical representation may include generating a graphical representation of a path between an external device and the service, wherein the path intersects with at least one element from the set of elements in each network layer from the hierarchical plurality of network layers. Automatically analyzing an electronic computing and communication system event may include outputting the graphical representation for presentation to a user.

BRIEF DESCRIPTION OF THE DRAWINGS

The description herein makes reference to the accompanying drawings wherein like reference numerals refer to like parts throughout the several views, and wherein.

DETAILED DESCRIPTION

An electronic computing and communication system may include many elements, such as computers, routers, switches, servers, and the like, in communication internally, within the electronic computing and communication system, and externally, with elements outside the electronic computing and communication system. The elements, individually or in combination, may generate event information messages or signals that may describe the status of the electronic computing and communication system, particularly changes in the status that may indicate a current or potential problem with the electronic computing and communication system. Events can be analyzed to identify how they affect the electronic computing and communication system and to determine how to correct current problems or mitigate the risk of future problems. Event analysis may be performed manually, which may include utilizing significant human resources to investigate and remediate events. For example, a human may manually trace physical wires connecting elements of the electronic computing and communication system or manually review data and interact with the electronic computing and communication system to identify current or historical state information for the electronic computing and communication system.

Automated electronic computing and communication system event analysis and management may reduce the human resource utilization associated with manual event analysis and management, and may reduce the risk of human error. In some embodiments, automated electronic computing and communication system event analysis and management may include receiving information indicating an event, automatically discovering and enumerating the elements of the electronic computing and communication system to generate a computer readable representation of the current network topology architecture, automatically investigating the electronic computing and communication system to determine current operational state metrics, automatically evaluating the event based on the current operational state metrics and the current network topology architecture to determine respective remediation priorities for the elements of the electronic computing and communication system affected by the event, automatically remediating one or more elements of the electronic computing and communication system, or a combination thereof. In some embodiments, automated electronic computing and communication system event analysis and management may include using one or more monitoring templates, which may be generated based on input, such as user input, or automatically based on automatically discovering and enumerating the elements of the electronic computing and communication system.

Figure 1:
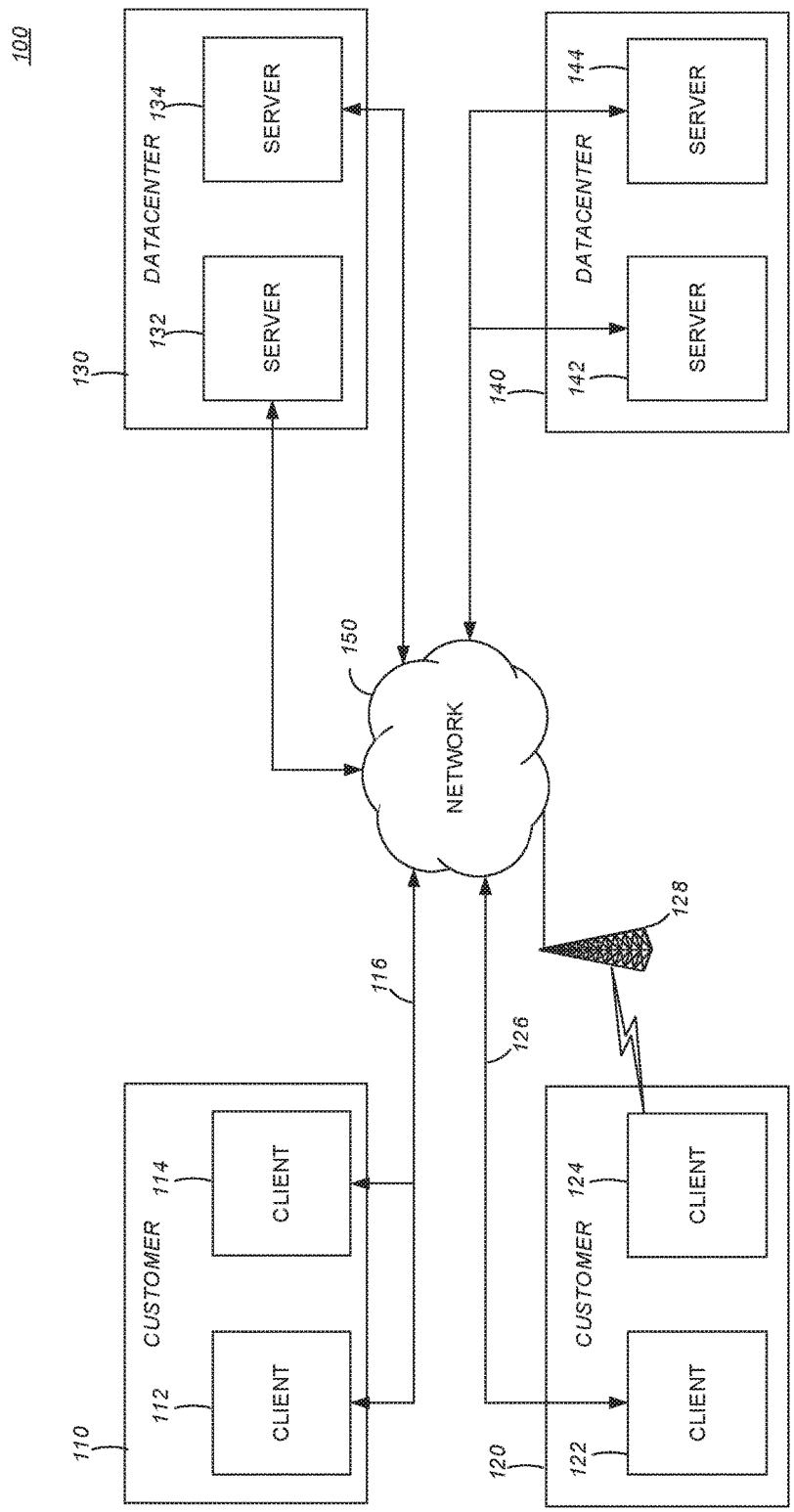
FIG. 1 is a schematic of an example of a cloud computing system in accordance with this disclosure.

FIG. 1 is a schematic of an example of an electronic computing and communication system 100 in accordance with this disclosure. The electronic computing and communication system can include customers, such as customers 110 and 120. A customer may have clients, such as clients 112, 114 for customer 110 and clients 122, 124 for customer 120. A client 112/114/122/124 may be implemented as a computing system, which may include one or more computing devices, such as a mobile phone, a tablet computer, a laptop computer, a notebook computer, a desktop computer, or any other computing device. Although two customers 110/120, each having two clients 112/114/122/124, are shown in FIG. 1, an electronic computing and communication system may include any number of customers or clients or may have a different configuration of customers or clients. For example, there may be hundreds or thousands of customers and each customer may have any number of clients.

The electronic computing and communication system 100 can include datacenters, such as the two datacenters 130/140 shown. Each datacenter may have servers. For example, as shown the top datacenter 130 includes two servers 132/134, and the bottom datacenter 140 includes two servers 142/144. Each datacenter 130/140 may represent a different location where servers are located, such as a datacenter facility in San Jose, Calif. or Amsterdam, Netherlands. Each server 132/

134/142/144 may be implemented as a computing system, which may include one or more computing devices, such as a desktop computer, a server computer, or any other computer capable of operating as a server. Although two datacenters 130/140, each including two servers 132/134/142/144 are shown in FIG. 1, an electronic computing and communication system may have any number of datacenters and servers or may have a different configuration of datacenters and servers. For example, there may be tens of data centers and each data center may have hundreds or any number of servers.

Clients 112/114/122/124 and servers 132/13/142/144 may be configured to connect to a network 150. In some implementations, the clients of a customer may connect to the network 150 via a common connection point. For example, the clients 112/114 of the customer 110 shown at the top left of FIG. 1, are shown as connected via a common connection point or link 116. In some implementations, one or more clients of a customer may connect to the network 150 via distinct links. For example, as shown in the bottom left of FIG. 1, a client 122 may be connected via a first link 126, and another client 124 may be connected via a second link communicating via link 128. A link may be wired, as shown by links 116/126, wireless, as shown by connection point 128, or may include a combination of wired and wireless mediums.

The network 150 can, for example, be the Internet. The network 150 can also be or include a local area network (LAN), wide area network (WAN), virtual private network (VPN), or any other means of electronic computer communication capable of transferring data between any of clients 112/114/122/124 and servers 132/134/142/144. The network 150, the datacenters 130/140, or any other element, or combination of elements, of the system may include network hardware such as routers, switches, load balancers, other network devices, or combinations thereof. For example, each of datacenters 130/140 may have one or more load balancers for routing traffic from network 150 to various servers, such as servers 132/134/142/144.

Other implementations of the electronic computing and communication system are also possible. For example, devices other than the clients and servers shown may be included in the electronic computing and communication system. In an implementation, one or more additional servers may operate as an electronic computing and communication system infrastructure control, from which servers, clients, or both, of the cloud infrastructure may be monitored, controlled, configured, or a combination thereof. For example, some or all of the techniques described herein may operate on said electronic computing and communication system servers. Alternatively or in addition, some or all of the techniques described herein may operate on servers, such as servers 132/134/142/144.

In some embodiments, one or more of the elements of the electronic computing and communication system 100, such as the clients 112/114/122/124 or the servers 132/134/142/144, may be configured to store, manage, and provide one or more databases, tables, or other information sources, or a portion thereof, such as a configuration management database (CMDB), a management information base (MIB), or a combination thereof. A configuration management database may include records representing one or more entities, devices, or units of the electronic computing and communication system, such as the clients 112/114/122/124, the customers 110/120, the datacenters 130/140, the servers 132/134/142/144, the access point 128, the network 150, or any other element, portion of an element, or combination of elements of the electronic computing and communication system 100. The configuration management database may include information describing the configuration, the role, or both, of an element of the electronic computing and communication system 100. In some embodiments, a management information base may include one or more databases listing characteristics of the elements of the electronic computing and communication system 100. In some embodiments, an object identifier (OID) may represent object identifiers of objects or elements in the MIB.

In some embodiments, automated electronic computing and communication system event analysis and management may be implemented on a single device, such as a single server. In some embodiments, automated electronic computing and communication system event analysis and management may be implemented on a combination of devices, such as a combination of clients 112/114/122/124 and servers 132/134/142/144.

Figure 2:
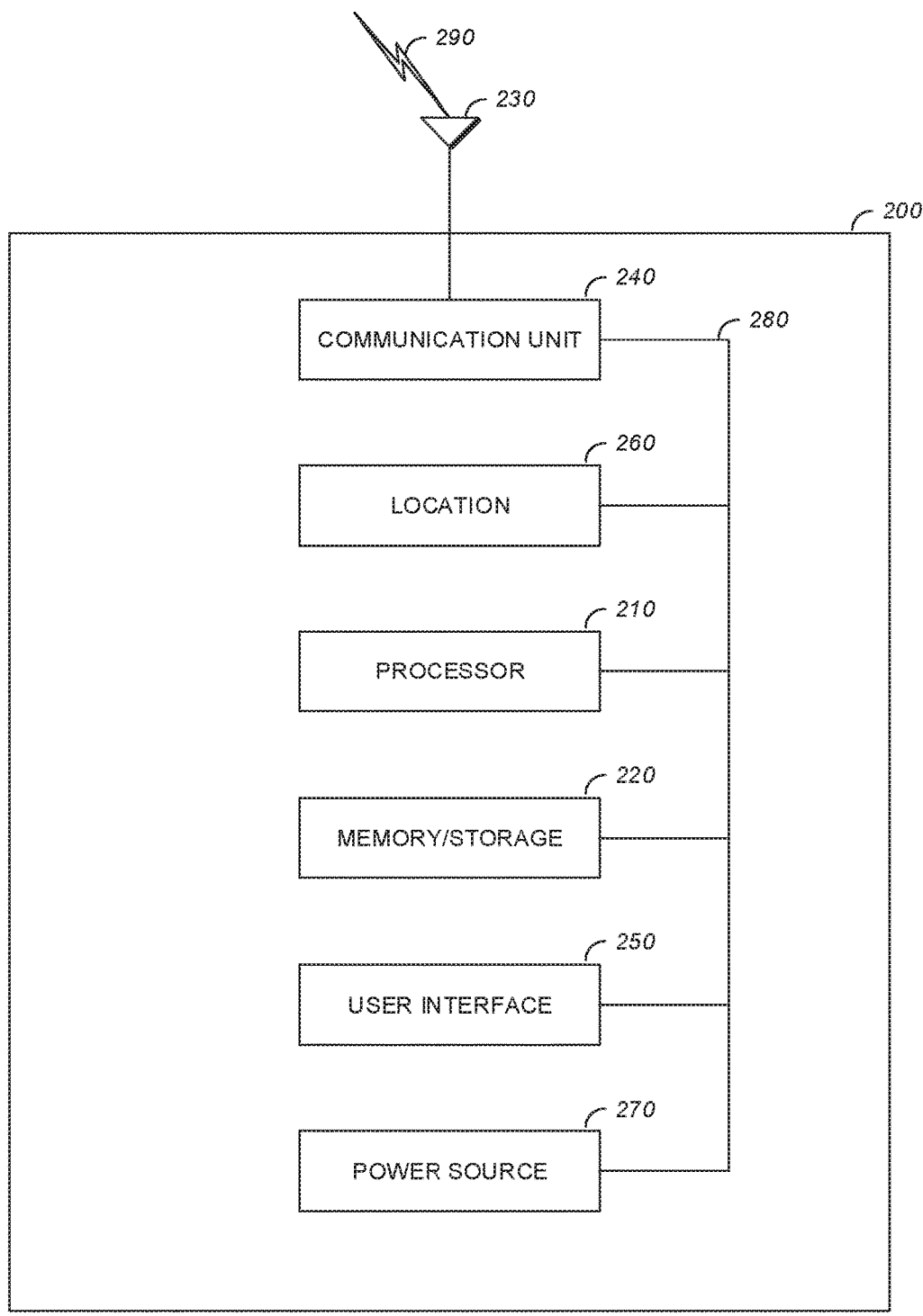
FIG. 2 is a block diagram of an example internal configuration of a computing device in accordance with this disclosure.

FIG. 2 is a block diagram of an example internal configuration of a computing device, such as a client 112/114/122/124 or a server 132/134/142/144 of the electronic computing and communication system 100 shown in FIG. 1. As previously described clients or servers may take the form of a computing system including multiple computing devices, or in the form of a single computing device, for example, a mobile phone, a tablet computer, a laptop computer, a notebook computer, a desktop computer, a server computer and the like.

The internal configuration can include a processor 210, such as a CPU, memory 220, a network communication unit 230, a network communication interface 240, a user interface 250, a location identification unit 260, a power source 270, a bus 280, or a combination thereof.

The processor 210 can be a conventional central processing unit. The processor 210 can include single or multiple processors each having single or multiple processing cores. Alternatively, the processor 210 can include another type of device, or multiple devices, capable of manipulating or processing information now-existing or hereafter developed. The processor 210 can be a general purpose processor or a special purpose processor.

In some embodiments, the memory 220 may include random access memory (RAM), read only memory (ROM), a disk drive, a solid state drive, or a combination thereof. The memory 220 can include executable instructions and data for immediate access by the processor 210. The memory 220 may include one or more DRAM modules such as DDR SDRAM. In some embodiments, the memory 220 can include another type of device, or multiple devices, capable of storing data for processing by the processor 210 now-existing or hereafter developed. The processor 210 may access and manipulate data in the memory 220 via the bus 280. The memory 220 can include executable instructions and application files along with other data. The executable instructions can include, for example, an operating system and one or more application programs for loading in whole or part into the memory 220 and to be executed by the processor 210. The operating system can be, for example, a Windows, Mac OS X, or Linux operating system. The application program can include, for example, a web browser, a web server, a database server, or a combination thereof. Application files can, for example, include user files, database catalogs, and configuration information. The memory 220 may comprise one or multiple devices and may utilize one or more types of storage, such as solid state or magnetic.

In some embodiments, the internal configuration may include one or more input/output devices, such as the network interface 240 and the user interface 250. The network interface 240 and the user interface 250 can be coupled to the processor 210 via the bus 280. The network interface 240 can, for example, provide a connection to a network, such as the network 150 shown in FIG. 1, and may take the form of a wired network interface, such as Ethernet, or a wireless network interface. Other output devices that permit a user to program or otherwise use the computing device 200 can be provided in addition to or as an alternative to the user interface 250. When the output device is or includes a display, the display can be implemented in various ways, including by a liquid crystal display (LCD) or a cathode-ray tube (CRT) or light emitting diode (LED) display, such as an OLED display.

Other implementations of the internal architecture of clients and servers are also possible. For example, servers may omit location unit 260. The operations of the processor 210 can be distributed across multiple machines which can be coupled directly or across a local area or other network. The memory 220 can be distributed across multiple machines such as network-based memory or memory in multiple machines performing the operations of clients or servers. Although depicted here as a single bus, the bus 280 can be composed of multiple buses.

In some implementations, automated electronic computing and communication system event analysis and management may include generating a computer readable representation of an electronic computing and communication system, which may include representing physical elements of the electronic computing and communication system, physical connectivity between elements of the electronic computing and communication system, logical connectivity between elements, or a combination thereof. For example, generating the computer readable representation may include determining a network topology, which may represent physical elements, physical connectivity, or both; a network architecture, which may represent logical connectivity; or a combination thereof. In some embodiments, the electronic computing and communication system may be represented by a network topology architecture, which may include a combination of the network architecture and the network topology.

In some embodiments, physical elements of the electronic computing and communication system, such as servers, routers, wired or wireless links, and the like, may be included in a physical layer, which may be represented by the network topology. In some embodiments, the network topology may represent physical elements of the electronic computing and communication system, their physical location, which may include relative physical location, geospatial physical location, or both, and physical connections. For example, an element of the electronic computing and communication system may communicate with another element of the electronic computing and communication system via a physical medium, such as a linear bus, which may be a physical cable. In some embodiments, physical elements within the physical layer may include other physical elements. For example, as shown in FIG. 2, a computer 200 may include a communication unit 240, such as an Ethernet interface.

In some implementations, elements of an electronic computing and communication system may communicate via a network stack, which may include hierarchy of network communication layers. In some embodiments, the lowest layer of the network stack may be the physical layer and may correspond with the network topology. In some embodiments, the electronic computing and communication system may include one or more network stack layers above the physical layer. For example, the electronic computing and communication system may include a data link layer above the physical layer and a network layer above the data link layer. In some embodiments, the data link layer may be omitted or combined with the network layer. In some embodiments, the electronic computing and communication system may include one or more host or service layers above the network layer. For example, the host layers may include a transport layer above the network layer, a session layer above the transport layer, a presentation layer above the session layer, an application layer above the presentation layer, or a combination thereof. In some embodiments, any one or more layers may be omitted or combined with other layers, and other layers may be included.

In some embodiments, the network architecture may represent the logical organization of the elements of the electronic computing and communication system, which may include representing routing, paths, or flows of information in the electronic computing and communication system. In some embodiments, the network architecture may include a series of functional network architecture layers, which may be oriented relative to a service, which may be, for example, an instance of an application executed on one or more physical servers. In some embodiments, the lowest layer of the network architecture may be the service, or access, layer. In some embodiments, the network architecture may include one or more layers above the service layer. In some embodiments, each layer may represent a defined degree of separation from, or proximity to, an instance of a service on one or more physical devices.

In some embodiments, the network architecture may include one or more distribution or aggregation layers above the service layer. In some embodiments, the distribution or aggregation layers may include elements of the electronic computing and communication system that distribute information toward the service layer elements, aggregate information from the service layer elements, or both. For example, the most proximate layer to the service layer, which may be referred to herein as the second layer, may include a Top of Rack (ToR) switch. The next most proximate layer, which may be above the second layer and may be referred to herein as the third layer, may include a Direct Server Return (DSR) load balancer.

In some embodiments, the network architecture may include one or more backbone, or core, layers above the service layer. In some embodiments, the backbone layers may include elements of the electronic computing and communication system that transport information between distribution or aggregation layer elements, transport communications between the electronic computing and communication system and external systems, or both. For example, the network architecture may include a fourth layer, above the third layer, which may be a core layer, which may represent the broadest scope of communication within the electronic computing and communication system, and a fifth layer, above the fourth layer, which may be a border layer, which may include, for example, a firewall.

In some embodiments, the network architecture may include an external interface layer, such as an Internet Service Provider (ISP) layer. In some embodiments, the external interface layer may include elements, such as a circuit, on the external side of an interface between the electronic computing and communication system and external systems, such as the Internet, and elements, such as a firewall, of a backbone layer, such as the boarder layer, may include elements on the internal side of the interface between the electronic computing and communication system and external systems.

In some embodiments, an element of the electronic computing and communication system may operate within one or more network architecture layers. In some embodiments, the operation of an element of the electronic computing and communication system may be identified as a role for the element. For simplicity and clarity, elements of the electronic computing and communication system operating according to roles in a network architecture layer may be described herein relative to an identified, or current, layer. For example, elements operating in the current layer may be referred to herein as lateral elements, elements operating in a layer below the current layer, which may be closer to the service layer, may be referred to herein as lower layer elements, and elements operating in layers above the current layer, which may be further from the service layer than the current layer, may be referred to herein as higher layer elements.

Figure 3:
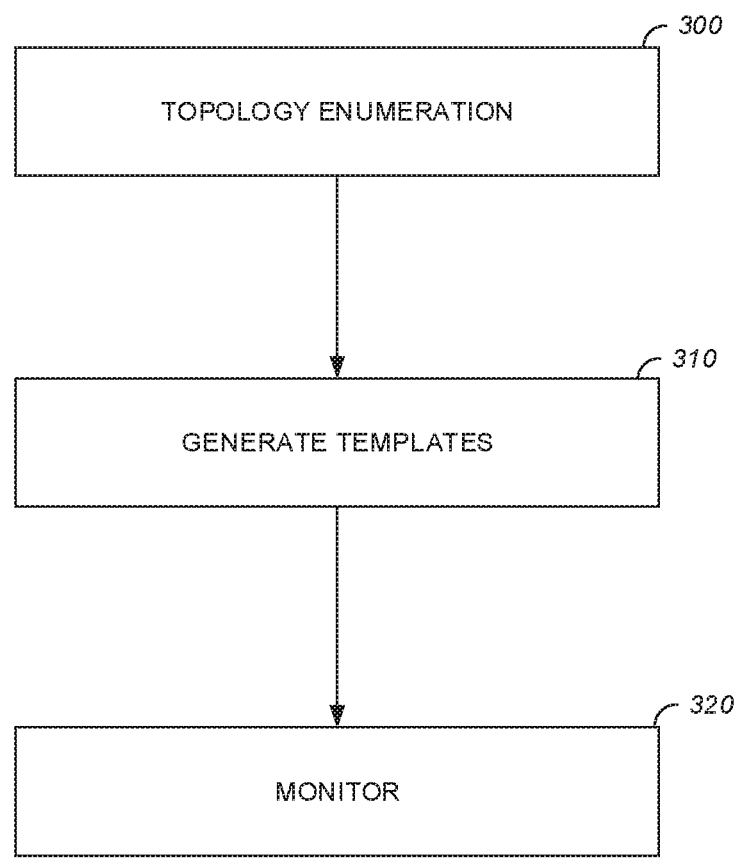
FIG. 3 is a flow diagram of an example of electronic computing and communication system monitoring in accordance with this disclosure.

FIG. 3 is a flow diagram of an example of electronic computing and communication system monitoring in accordance with this disclosure. In some embodiments, automated electronic computing and communication system event analysis and management may include monitoring and may be implemented in one or more computing devices, such as one or more of the clients 112/114/122/124, the servers 132/134/142/144, or a combination thereof as shown in FIG. 1.

Implementations of automated electronic computing and communication system event analysis and management may include monitoring an electronic computing and communication system which may include automated topology enumeration at 300, generating monitoring templates 310, monitoring the electronic computing and communication system at 320, or a combination thereof.

In some embodiments, the electronic computing and communication system topology may be automatically enumerated at 300. In some embodiments, automatic network topology enumeration may include automatically discovering one or more elements, such as devices or units, in the electronic computing and communication system, discovering communication connections between the elements, determining a logical organization of network communication, or a combination thereof. In some embodiments, automated topology enumeration at 300 may be similar to the automated topology enumeration shown in FIG. 5.

In some embodiments, one or more monitoring templates may be generated at 310. In some embodiments, a monitoring template may indicate one or more elements of the electronic computing and communication system to be monitored. In some embodiments, generating monitoring templates may include manually generating monitoring templates, automatically generating monitoring templates, or both.

In some embodiments, manually generating monitoring templates may include generating a monitoring template, which may include copying or modifying a previously generated monitoring template, in response to input, such as user input. For example, a first monitoring template may be associated with a device manufacturer and a second monitoring template may be generated based on the first monitoring template and may be associated with a device manufactured by the device manufacturer.

In some embodiments, automatically generating monitoring templates may include automatically generating, which may include copying or modifying a previously generated monitoring template, monitoring templates based on the topology of the electronic computing and communication system, such as the topology automatically enumerated at 300. For example, one or more monitoring templates may be generated automatically based on the SNMP discovery information.

In some embodiments, one or more monitoring templates may be stored in a data store, such as a configuration management database (CMDB). In some embodiments, the stored monitoring templates may be associated with, or mapped to, information indicating the discovered elements of the electronic computing and communication system, such as the manufacturer of the element, the device type of the element, the model of the element, the firmware version for the element, one or more hardware components of the element, or a combination thereof.

In some embodiments, elements of the electronic computing and communication system may be monitored at 320. In some embodiments, the electronic computing and communication system may be monitored at 320 based on the monitoring templates. For example, the electronic computing and communication system may be monitored at 320 based on defined monitoring templates, based on the monitoring templates generated at 310, or based on a combination of defined monitoring templates and automatically generated monitoring templates. In some embodiments, a monitoring template may be associated with one or more metrics, or conditions, and monitoring at 320 may include determining whether to include a monitoring template in the monitoring based on the associated metrics. For example, generating the monitoring templates at 320 may include determining metrics, or values thereof, for respective monitoring templates based on, for example, the information identified at 310. In some embodiments, one or more metrics, or values thereof, may be determined in response to input, such as user input.

Figure 4:
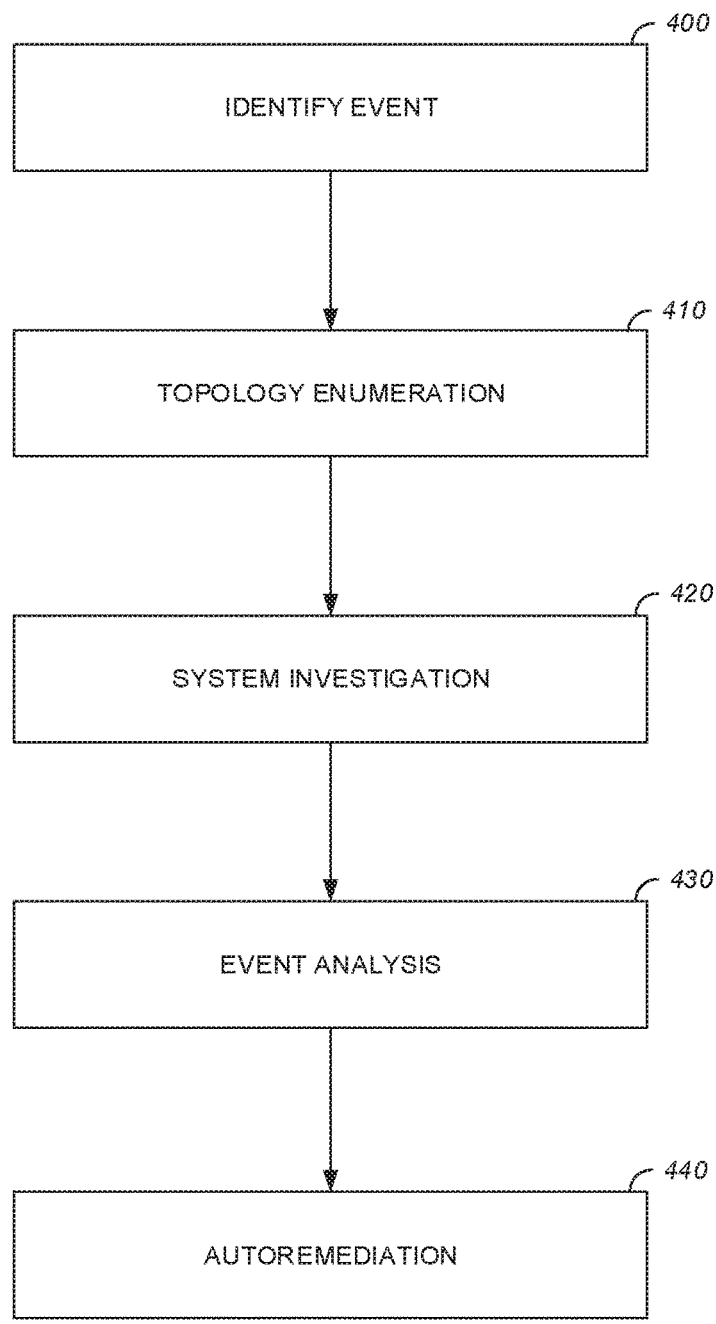
FIG. 4 is a flow diagram of an example of automated electronic computing and communication system event analysis and management in accordance with this disclosure.

FIG. 4 is a flow diagram of an example of automated electronic computing and communication system event analysis and management in accordance with this disclosure. In some embodiments, automated electronic computing and communication system event analysis and management may be implemented in one or more computing devices, such as one or more of the clients 112/114/122/124, the servers 132/134/142/144, or a combination thereof as shown in FIG. 1.

Implementations of automated electronic computing and communication system event analysis and management may include identifying an event at 400, automated topology enumeration at 410, automated system investigation at 420, automated event analysis at 430, automated remediation at 440, or a combination thereof.

In some embodiments, an event may be identified at 400, which may include identifying information indicating an event in an electronic computing and communication system. In some embodiments, a diagnostic unit, such as an element of the electronic computing and communication system, which may be a server, such as server 132/134/142/144 shown in FIG. 1, may receive event information, such as a message, notification, or a signal, indicating an event or incident in the electronic computing and communication system.

In some embodiments, an event, or incident, notification may include information representing a network or device event, an alarm condition, the opening of a service ticket, or any other occurrence describing a change in the electronic computing and communication system. In some embodiments, an event or incident may represent an adverse state of one or more elements of the electronic computing and communication system. In some embodiments, an event may be a network layer event, a host layer event, or an event associated with any other network communication layer. In some embodiments, the event notification may be received from a system or component external to the elements implementing automated electronic computing and communication system event analysis and management. In some embodiments, an event notification may describe an event affecting one or more network communication layers, such as the network layer, the host or service layer, or any other network communication layer.

In some embodiments, an event may be associated with a subject, which may represent a failed or affected service, such as an application, which may provide a service, such as a data storage service, a data manipulation service, a presentation service, a communication service, or the like. For example, the subject service may be an e-mail service, a printing service, a network file system, directory services, a file sharing service, an instant messaging service, a video telephony service, a world wide web service, a time service, or any other service that may be included in the electronic computing and communication system.

In an example, an event notification may be a machine-readable communication, message, or other signal automatically generated by one or more of the elements of the electronic computing and communication system that experienced or detected the event.

In some embodiments, identifying an event at 400 may include receiving a message at the diagnostic unit and evaluating the message to determine whether the message indicates an event notice. For example, the diagnostic unit may evaluate a list, or other data store, of defined events based on information included in the message to determine whether the message indicates an event. In some embodiments, a message may be identified as an event notice in response to input, such user input, indicating that the message is an event notice.

In some embodiments, the electronic computing and communication system topology may be automatically enumerated at 410. In some embodiments, automatic enumeration may be performed at 410 in response to receiving the event notification at 400. In some embodiments, automated topology enumeration at 410 may be similar to the automated topology enumeration shown at 300 in FIG. 3 or the automated topology enumeration shown in FIG. 5. In some embodiments, automated network topology enumeration at 410 may include associating one or more discovered element with the event notification identified at 400. For example, information describing the discovered element, such as a list of enumerated network devices, may be associated with, or included in, an incident ticket, such as by including the information describing the discovered device in a work note associated with the incident ticket.

In some embodiments, the electronic computing and communication system may be automatically investigated at 420. In some embodiments, automated electronic computing and communication system event analysis and management may include identifying an element of the electronic computing and communication system based on the computer readable representation of the electronic computing and communication system generated at 410. In some embodiments, automated electronic computing and communication system event analysis and management may include identifying a metric for the element of the electronic computing and communication system. In some embodiments, automatically investigating the electronic computing and communication system at 420 may include determining a value for the metric for the element of the electronic computing and communication system.

In some embodiments, the electronic computing and communication system topology generated at 410 may indicate one or more elements and may indicate one or more metrics for respective elements, and automatically investigating the electronic computing and communication system may include determining values, such as current status values, for the one or more metrics for one or more elements of the electronic computing and communication system at 420.

In some embodiments, automatically investigating the electronic computing and communication system at 420 may include evaluating, such as iteratively, the elements of the electronic computing and communication system identified at 410.

In some embodiments, current metric values may be determined using polling or otherwise querying one or more of the elements of the electronic computing and communication system. In some embodiments, current metric values may be determined by retrieving stored or historical information from ongoing or previously executed metrics collection.

In some embodiments, the metrics may be categorized based on the network architecture, the currently running services, or the like. For example, the categories may include change, availability, performance, capacity, variance, or a combination thereof.

In some embodiments, one or more values of one or more metrics may be identified as abnormal, which may indicate a current problem or likely future problem, and the metric may be identified, or flagged, for further evaluation.

In some embodiments, automatically investigating the electronic computing and communication system at 420 may include evaluating the identified current metric values to identify a probability that the respective status may affect a related service.

In some embodiments, automatically investigating the electronic computing and communication system at 420 may include identifying network reporting information, such as by querying a network reporting layer, which may be generated using SNMP polling, SNMP traps, Syslog data, Nedlow data, transaction collection data, or the like.

In some embodiments, automatically investigating the electronic computing and communication system at 420 may include identifying relevant change management information. Change management information may indicate configuration changes occurring in one or more of the enumerated electronic computing and communication system elements. For example, a change management system, which may be an external system, may be queried, or polled, to identify recent, or current, tracked changes to the electronic computing and communication system. In some embodiments, one or more configuration management data sources, which may be provided by internal systems, within the electronic computing and communication system, or external systems, may be queried to identify configuration changes omitted from the change management system. In some embodiments, one or more external maintenance or configuration systems, such as a vendor system, may be queried to identify changes to elements that affect the electronic computing and communication system and are omitted from internal change and configuration management data sources. For example, external changes may include changes by an ISP, such as circuit maintenance.

In some embodiments, automatically investigating the electronic computing and communication system at 420 may include identifying availability information. Availability information may include a category of metrics pertaining to availability of an element of the electronic computing and communication system, one or more components thereof, or a group of elements and related components. In some embodiments, information indicating an abnormal availability may affect a relatively large portion of the electronic computing and communication system and may be associated with a relatively high weight.

In some embodiments, automatically investigating the electronic computing and communication system at 420 may include identifying performance information. Performance information may include a category of metrics pertaining to the performance of an element of the electronic computing and communication system, one or more components thereof, or a group of elements and related components. In some embodiments, information indicating an abnormal performance condition or state may affect a relatively large portion of the electronic computing and communication system and may be associated with a relatively high weight. For example, performance information may include CPU utilization, memory utilization, traffic utilization, or the like.

In some embodiments, automatically investigating the electronic computing and communication system at 420 may include identifying capacity information. Capacity information may include a category of metrics representing utilization, such as peak or average utilization, relative to maximum capacity or capability for a feature of an element of the electronic computing and communication system, one or more components thereof, or a group of elements and related components.

In some embodiments, automatically investigating the electronic computing and communication system at 420 may include identifying variance information. Variance information may include information indicating a variance in a metric value that exceeds a defined range, such as a range, which may be positive, negative, or both, defined from a defined baseline value for an element of the electronic computing and communication system, one or more components thereof, or a group of elements and related components. For example, a load balancer may balance a volume or amount of traffic for a server pool within a defined range, the load balancer may start blocking all inbound traffic to the server pool, the traffic volume of that pool may drop to zero without otherwise generating an error, and which may indicate a variance greater than the defined range.

In some embodiments, the topology enumeration at 410, the system investigation at 420, or a combination thereof, may identify one or more services that may be affected by the event identified at 400.

In some embodiments, the event may be automatically analyzed at 430. In some embodiments, automated event analysis at 430 may include evaluating the network elements enumerated at 410, the metric values determined at 420, or a combination thereof.

In some embodiments, automated event analysis at 430 may include determining whether a metric value associated with an element of the electronic computing and communication system indicates an abnormal value, such as a value that exceeds a defined threshold or a value outside a defined expected range associated with the metric and the element, and the element, the metric, or a combination thereof, may be identified for further evaluation. For example, an element may be associated with a flag, which may indicate that an abnormal value was identified for the element.

In some embodiments, automated event analysis at 430 may include generating output, such as a summary report, which may identify one or more elements of the electronic computing and communication system for remediation, such as the auto-remediation at 440. For example, elements may be identified for remediation based on a probability of failure for the element, a measure of the expected affect that an identified abnormality at the element may have on other elements of the electronic computing and communication system, or a combination thereof.

In some embodiments, one or more flags, which may represent abnormal values, may be associated with one or more categories, such as the change category, the availability category, the performance category, the capacity category, the variance category, or the like. In some embodiments, a flag may be associated with a value, such as a weighted value, which may represent an indication of a priority for remediating the element in response to the event. For example, a relatively low value associated with a flag may indicate a low priority for remediating the element and a relatively high value associated with the flag may indicate a high priority for remediating the element. In some embodiments, flags associated with the availability category may be associated with a relatively high weight, such as 255, flags associated with the change category may be associated with a weight lower than the availability weight, such as 200, flags associated with the performance category may be associated with a weight lower than the change weight, such as 150, and flags associated with the capacity category may be associated with a weight lower than the performance weight, such as 100.

In some embodiments, the flag value for the metrics within a category may be identified based on the category. For example, performance metrics may be associated with the flag value of 150. In some embodiments, one or more metrics may be associated with a flag value relative to, or independent of, the category flag value. For example, the performance category may include a latency metric, and a latency flag associated with an abnormal value of the latency metric may be associated with a latency flag value, which may differ from the performance flag value.

In some embodiments, each layer in the network topology architecture may be associated with a value, such as a weighted value, which may represent the expected affect that an abnormality of an element of the electronic computing and communication system within the respective layer may have on other, related, elements of the electronic computing and communication system, such as the expected affect that the abnormality may have on a service in communication with the element associated with the abnormality. In some embodiments, the network topology architecture layer values may be based on the relative distance of the network topology architecture layer from the service. In some embodiments, the network topology architecture layer values may be inversely proportional to the relative distance from the lowest layer. For example, a routing layer, adjacent to the service layer, may have a relatively high network topology architecture layer value, such as 255, a distribution layer, such as a load balancing layer, above, or more remote than, the routing layer, may have a network topology architecture layer value lower than the routing layer value, such as 200, a core layer, above the distribution layer, may have a network topology architecture layer value lower than the distribution layer value, such as 150, a border layer, above the core layer, may have a network topology architecture layer value lower than the core layer value, such as 100, and an Internet layer, above the border layer, may have a network topology architecture layer value lower than the border layer, such as 50.

In some embodiments, flag values, including category flag values and metric flag values, the network topology architecture layer values, or a combination thereof, may be identified based on input, such as user input.

In some embodiments, automated event analysis at 430 may include generating a remediation priority for the element of the electronic computing and communication system based on a metric weight a network layer value. In some embodiments, the remediation priority may indicate a priority, or order, of elements of the electronic computing and communication system, for remediating, further investigating, repairing, or the like, the electronic computing and communication system in response to the event.

Figure 6:
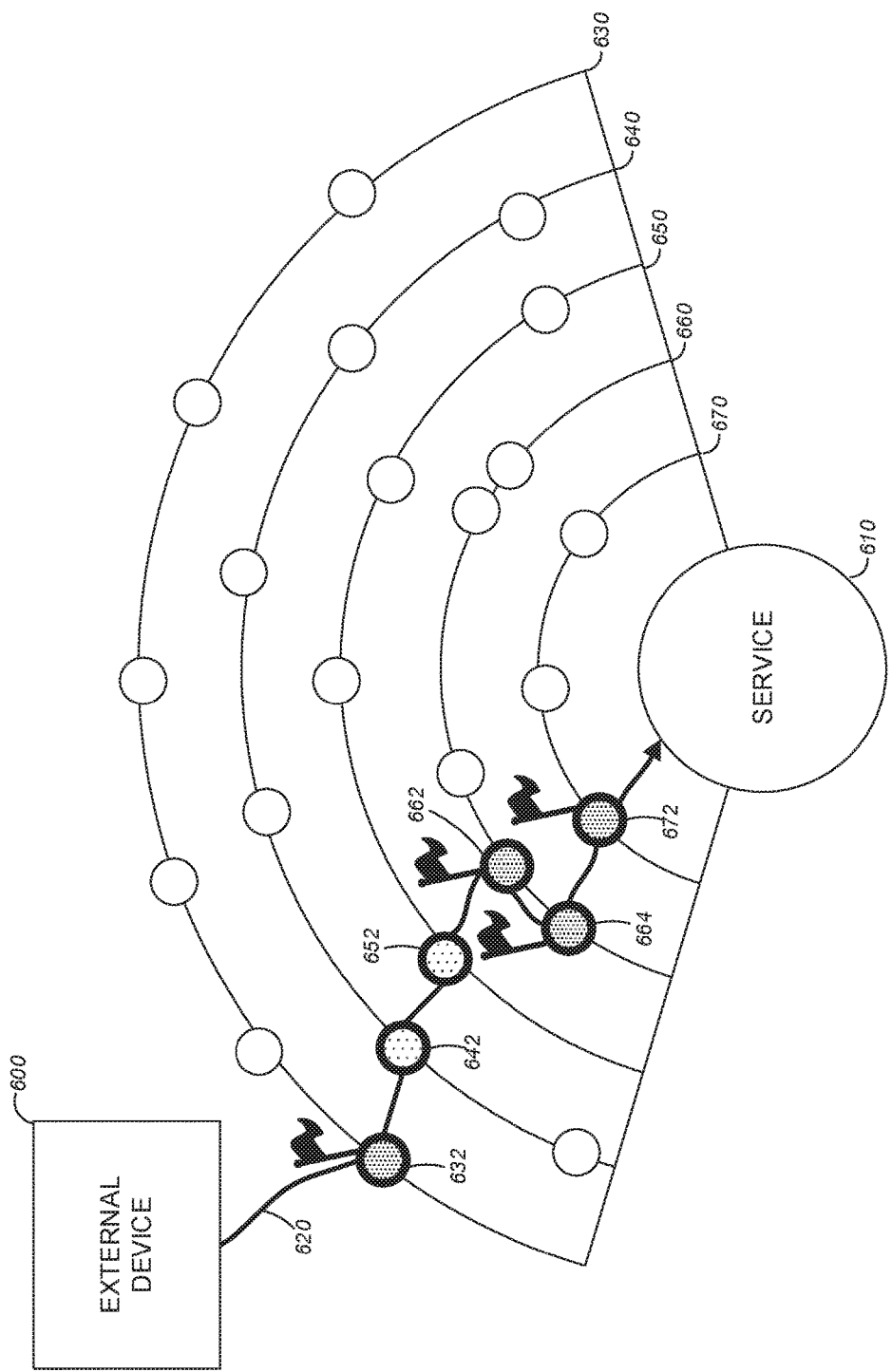
FIG. 6 is a diagram of an example of an interface for electronic computing and communication system automated event analysis in accordance with this disclosure.

In some embodiments, automated event analysis at 430 may include generating, storing, outputting, or a combination thereof, one or more reports representing a result of the automated event analysis, such as the example graphical representation shown in FIG. 6.

In some embodiments, automated event analysis at 430 may include receiving external information indicating a measure of accuracy for the automated event analysis. For example, input, such as user input, indicating an evaluation of the automated event analysis, such as a measurement of accuracy of the automated event analysis may be received in response to outputting the automated event analysis information, and may be stored in association with the automated event analysis information.

In some embodiments, one or more elements of the electronic computing and communication system may be automatically remediated at 440. In some embodiments, automatic remediation, or auto-remediation, at 440 may include automatically configuring, or adjusting the configuration of, one or more elements of the electronic computing and communication system. In some embodiments, auto-remediation at 440 may include generating one or more remediation records and storing the remediation records in association with one or more of the elements enumerated at 410, one or more of the metric values determined at 420, the automated event analysis information, or a portion thereof, identified at 430, or a combination thereof. For example, the event may be associated with a service ticket and the auto-remediation information may be included in, or stored in association with, the service ticket.

In some embodiments, auto-remediation at 440 may include executing one or more defined procedures. In some embodiments, auto-remediation may include determining whether to perform auto-remediation. In some embodiments, whether to perform auto-remediation may be determined based on a measure of accuracy for the analysis determined at 430, or for one or more similar analysis. For example, one or more auto-remediation procedures may be defined for a scope, such as an event type, a subject, an element, an element type, a role, a metric, a metric category, a metric value, a layer, or any other aspect, or combination of aspects, or the electronic computing and communication system, an aggregate, maximum, or most recent, value of automated event analysis corresponding to the scope may exceed a defined threshold, such as a threshold defined in response to input, such as user input, and the auto-remediation procedures may be implemented. In some embodiments, the value for the automated event analysis may be within the defined threshold, or auto-remediation procedures may be unavailable, and auto-remediation may be omitted.

Figure 5:
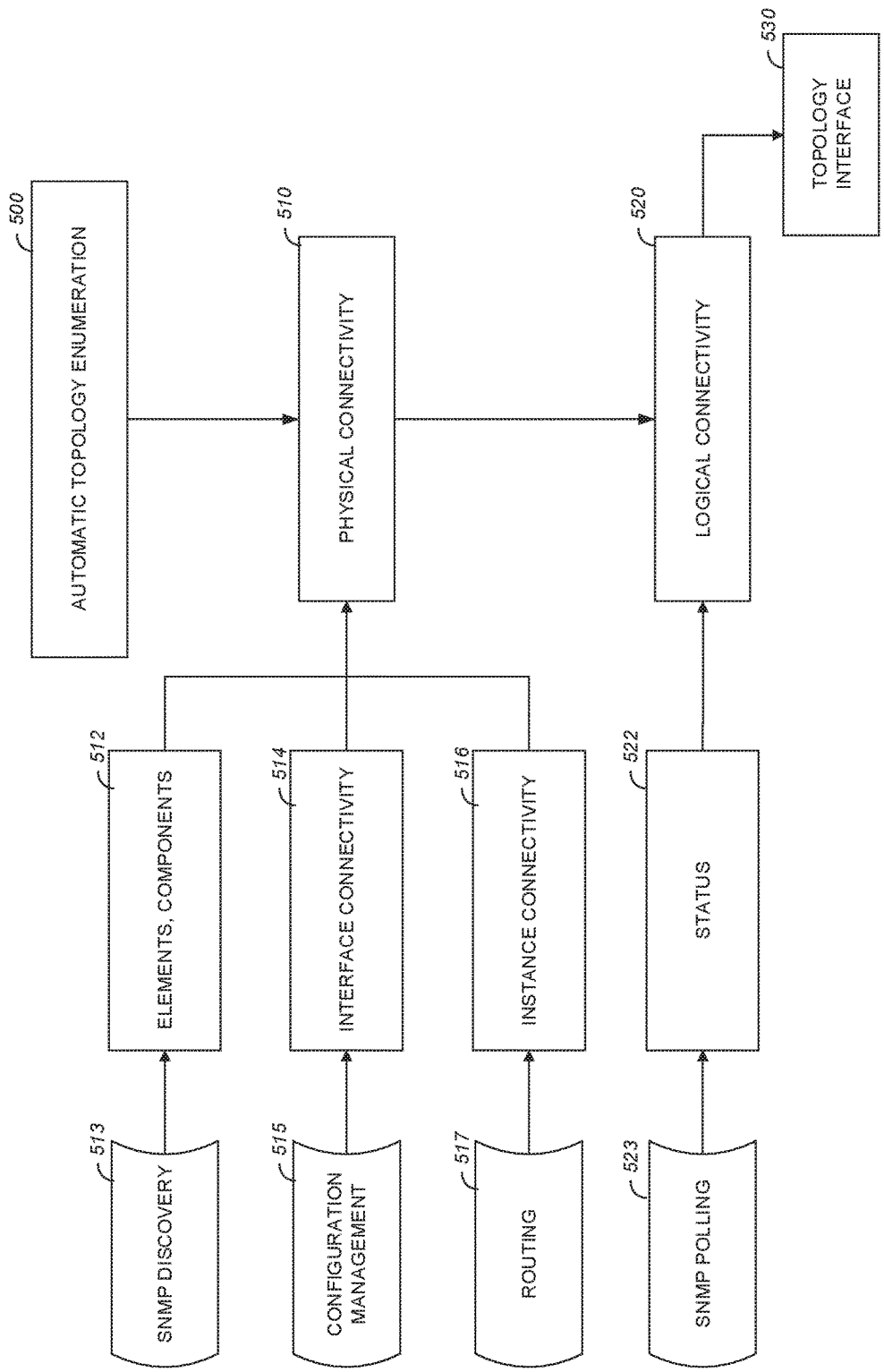
FIG. 5 is a flow diagram of an example of electronic computing and communication system automated topology enumeration in accordance with this disclosure.

FIG. 5 is a flow diagram of an example of electronic computing and communication system automated topology enumeration in accordance with this disclosure. In some embodiments, automated topology enumeration may be implemented in one or more computing devices, such as one or more of the clients 112/114/122/124, the servers 132/134/142/144, or a combination thereof as shown in FIG. 1.

In some embodiments, automated, or automatic, topology enumeration may be performed at 500, which may include generating a computer readable representation of the electronic computing and communication system using automated topology enumeration. The computer readable representation may represent a plurality of elements of the electronic computing and communication system organized in a hierarchy of network layers.

Implementations of automated topology enumeration at 500 may include generating information representing physical topology at 510, generating information representing logical topology at 520, or a combination thereof. In some embodiments, the physical topology may represent the physical configuration of elements of the electronic computing and communication system, such as routers, switches, computers, servers, cables, and the like. In some embodiments, the logical topology may represent the organization of the flow of information in the electronic computing and communication system, such as routing information.

In some embodiments, automated network topology enumeration at 500 may include generating or collecting a machine-readable description of one or more devices in the electronic computing and communication system, one or more subcomponents of the devices, or a combination thereof. In some embodiments, automated network topology enumeration at 500 may include identifying physical interconnections of the devices and subcomponents. In some embodiments, automated network topology enumeration at 500 may include generating a machine-readable description of connections between physical servicers and a network topology stack. In some embodiments, automated network topology enumeration at 500 may include generating a description of logical network connectivity.

In some embodiments, automated enumeration at 500 may include automatically discovering substantially all of the elements of the electronic computing and communication system.

In some embodiments, automated enumeration at 500 may include automatically discovering elements based on one or more direct or indirect logical or physical relationships with a defined subject, such as a service affected by an identified event. In some embodiments, one or more elements of the electronic computing and communication system within a defined relationship distance from an affected service may be automatically discovered, detected, or identified. For example, a portion of the electronic computing and communication system may include elements communicating with external devices via an internet service provider, and the defined relationship distance may include the elements communicating with external devices via the internet service provider, which may include discovering the internet service provider, or a portion thereof, discovering ports on switches, or any other element or combination of elements. In some embodiments, one or more elements or types of element may correspond with a network edge, and may indicate an outer limit for automated topology enumeration.

In some embodiments, information representing physical connectivity may be generated at 510. In some embodiments, generating the information representing the physical connectivity layer at 510 may include enumerating the physical elements of the electronic computing and communication system, enumerating the respective physical components of each physical element, generating information representing connections between the elements and the respective components thereof, or a combination thereof, as indicated at 512. For example, the components of a physical element of the electronic computing and communication system may include attached interfaces, ports, port-channels, virtual local area networks, or the like.

In some embodiments, a connection, such as a connection between two physical elements of the electronic computing and communication system, may be represented as a sequence alternating between physical elements, such as a device or a component, and relationships descriptions, such as consistsOf, connectedTo, partOf, or the like. As used in herein the topology relationship descriptions are non-limiting. For example, an element that 'consistsOf' a component may also 'consistOf' other components.

In some embodiments, automated network topology enumeration may include physical discovery, such as simple network management protocol (SNMP) discovery as shown at 513. For example, a SNMP collector may perform SNMP discovery. In some embodiments, physical discovery may include using a discovery function of a software-as-a-service (SaaS) platform.

In some embodiments, SNMP discovery may include identifying information describing one or more elements of the electronic computing and communication system, which may include information indicating a manufacturer of the element, a device type of the element, a model of the element, a firmware version for the element, one or more hardware components of the element, or a combination thereof. In some embodiments, SNMP discovery may include evaluating, or processing, one or more SNMP management information bases (MIBs), and enumerating one or more object identifiers indicated in a respective management information base, each of which may represent a respective element of the electronic computing and communication system. In some embodiments, one or more SNMP MIBs may be identified from an MIB repository, may be provided by a vendor, or both.

In some embodiments, automated topology enumeration may include generating information describing connections between the enumerated elements, such as an interface to interface connection between an interface of a first device and an interface of a second device as shown at 514. In some embodiments, generating information describing connections between the enumerated elements may include identifying network protocol information for the elements, such as Cisco Discovery Protocol (CDP) information, Link Layer Discovery Protocol (LLDP) information, or a combination thereof. In some embodiments, the network protocol information may be determined by recovering, or pulling, the information, or a portion thereof, from one or more network devices. In some embodiments, component connectivity information, such as interface connectivity information, may be generated based on the network protocol information. For example, the component connectivity information may indicate that a first component of a first device is connected to a second component of a second device. In some embodiments, the information describing connections between the enumerated elements may include data link layer information.

In some embodiments, the physical device connectivity information, such as the information identified using SNMP discovery and the interface connectivity information, such as the information identified using CDP and LLDP information, may be combined. For example, a first element of the electronic computing and communication system, 'deviceA', may include a first interface component, such as a first Ethernet port, 'eth0', and a second element of the electronic computing and communication system, 'deviceB', may include a second interface component, such as a second Ethernet port, 'eth1'. The first device may communicate with the second device using the first interface component and the second interface component respectively. The physical device connectivity information, such as the information identified using SNMP discovery, may identify the first device, the first interface, that the first device includes (consistsOf), and communicates via, the first interface, the second device, the second interface, and that the second device includes (consistsOf), and communicates via, the second interface. The interface connectivity information, such as the information identified using CDP and LLDP information, may indicate the connectivity between the first device and the second device via the first interface and the second interface respectively. In some embodiments, the combined information may be expressed directionally. For example, the combined information may express the connectivity from the first device to the second device, from the second device to the first device, or both, which may be expressed as the following:

deviceA→consistsOf→eth0→connectedTo→eth1→partOf→deviceB,
deviceB→consistsOf→eth1→connectedTo→eth0→partOf→deviceA.

In some embodiments, automatic network topology enumeration may include generating information representing physical device network connectivity, such as connectivity for a server or a server instance to communicate on a physical network portion or segment as shown at 516. In some embodiments, information representing physical device network connectivity may describe how a physical element of the electronic computing and communication system connects with the network topology stack. In some embodiments, the information representing physical device connectivity may be identified based on server media access control (MAC) address to Top of Rack (ToR) switch port mapping. In some embodiments, this information may be retrieved from a table, or other information store, such as a CnsCamTable generated by Cisco networking services (CNS), which may include layer 2 discovery information, such as port mapping information, as shown at 517. For example, information describing physical connectivity between a first element of the electronic computing and communication system, 'serverA', and a second element of the electronic computing and communication system, 'switchA', may be expressed as the following:

serverA→consistsOf→interface/MAC→connectedTo-→switchPort→partOf→switch.

In some embodiments, automated network topology enumeration may include using a dynamic table in a network switch that maps MAC addresses to ports, such as a content addressable memory (CAM) table, a MAC table, a filter table, or any network routing or addressing information store. In some embodiments, automated network topology enumeration may include using a dynamic table collection to create a topology map that includes network devices, such as servers.

In some embodiments, automated network topology enumeration may include circuit providers, internet service providers, or both, in the topology. In some embodiments, automated network topology enumeration may include integrating with the CMDB to define device roles and respective weighted values, which may be used to build a network architecture aware topology. In some embodiments, automated network topology enumeration may include collecting information to determine an information traffic flow patterns, such as paths, which may include information such as dynamic routing tables, failover status of devices, and address resolution protocol (ARP) to port mapping.

In some embodiments, automatic network topology enumeration may include associating a customer instance with a network interface, such as a ToR switch port. In some embodiments, a customer instance may represent an application or service associated with a customer and executing, at least in part, on a physical server. In some embodiments, information, such as information stored in the CMDB, may indicate an association between a customer instance and one or more servers, which may be combined with the physical device network connectivity information, such that customer instances may be mapped to identified ToR switch ports.

In some embodiments, automatic network topology enumeration may include generating information representing logical connectivity for the electronic computing and communication system as shown at 520. In some embodiments, the logical connectivity information may be generated based on, for example, network architecture information, routing protocol status information, default gateway information, circuit connectivity information, ISP connectivity information, hot standby router protocol (HSRP) status information, such as active or passive status, virtual router redundancy protocol (VRRP) status information, netscreen standby routing protocol (NSRP) status information, or the like, as shown at 522.

In some embodiments, the logical network architecture may include a hierarchy of logical network architecture layers and an element of the electronic computing and communication system, such as a router or a switch, may operate in one or more logical network architecture layers. In some embodiments, one or more device roles may be defined and stored, such as in the CMDB, and may represent the operation of an element of electronic computing and communication system in an identified logical network architecture layer.

In some embodiments, a network architecture layer value may be associated with a defined device role. In some embodiments, a network architecture layer value may indicate a network layer associated with a define role. In some embodiments, relative network layer orientation of elements in the electronic computing and communication system may be identified based on the associated network architecture layer values. For example, automatic network topology enumeration may include determining whether an element of the electronic computing and communication system is above, below, or lateral to another element of the electronic computing and communication system based on the respective network architecture layer values associated with the roles associated with the respective elements.

In some embodiments, one or more elements of the electronic computing and communication system may operate using an active mode or a passive mode. In some embodiments, the physical connectivity information and the logical connectivity information may be combined and routing information, such as network traffic patterns or paths, may be identified by polling, such as SNMP polling, elements of the electronic computing and communication system to identify the active or passive status of the respective elements, as shown at 523.

In some embodiments, an electronic computing and communication system may use dynamic routing protocols to route traffic. In some embodiments, such as embodiments that include using dynamic routing protocols to route traffic, the routing information may be identified based on, for example, open shortest path first (OSPF) routing protocol, border gateway protocol (BGP), or the like. In some embodiments, one or more elements of the electronic computing and communication system, such as a server, may perform a hashing function, which may be used to determine a route, and a corresponding pair of network devices may be included in a network path.

In some embodiments, automated network topology enumeration may include providing, using, or both, a topology application programming interface (API) as shown at 530. For example, a function exposed by the topology API may receive an identifier of an element of the electronic computing and communication system, such as a network device or a server, and may respond with information indicating one or more elements of the electronic computing and communication system, which may be in communication with the identified element, such as elements on the same network architecture layer as the identified element, elements in the network architecture layers below the identified element, elements in the network architecture layers above the identified element, or a combination thereof.

The topology API may receive a topology request for the an element of the electronic computing and communication system associated with a DSR role, and may respond with information indicating elements of the electronic computing and communication system lateral to, or in the same network architecture layer as, the DSR role, such as the third network architecture layer, elements of the electronic computing and communication system in the network architecture layers above the DSR layer, such as the fourth, fifth, and sixth network architecture layers, and elements of the electronic computing and communication system in the network architecture layers below the DSR layer, such as the first and second network architecture layers.

FIG. 6 is a diagram of an example of an interface for electronic computing and communication system automated event analysis in accordance with this disclosure. In some embodiments, automated event analysis, such as the automated event analysis shown at 430 in FIG. 4, may include generating, storing, outputting, presenting, or a combination thereof, one or more reports representing a result of the automated event analysis.

In some embodiments, the graphical representation of the automated event analysis may include a graphical representation of an external device 600 in communication with a service 610 via a path 620. The graphical representation may include one or more elements of the electronic computing and communication system, shown as small circles, within one or more network topology architecture layers 630/640/ 650/660/670. In some embodiments, the path 620 may include one or more of the more elements of the electronic computing and communication system, such as element 632 in layer 630, element 642 in layer 640, element 652 in layer 650, elements 662 and 664 in layer 660, and element 672 in layer 670, as shown. Although a single path is shown for simplicity and clarity, elements of the electronic computing and communication system may communicate with other elements of the electronic computing and communication system or with external communicating elements, such as the external device 600, via any number of paths.

In some embodiments, the network topology architecture layers 630/640/650/660/670 may correspond with respective network topology architecture layer values. For example, the layer 630 most remote from the service 610 may represent the Internet layer and may be associated with relatively low value, such as 50, the layer 640 inside, or below, the Internet layer 630, may represent the border layer and may be associated with value greater than the Internet layer 630 value, such as 100, the layer 650 inside, or below, the border layer 640, may represent a core layer and may be associated with value greater than the border layer 640 value, such as 150, the layer 660 inside, or below, the core layer 650, may represent a distribution layer and may be associated with value greater than the core layer 650 value, such as 200, and the layer 670 inside, or below, the distribution layer 660, may represent an aggregation layer and may be associated with value greater than the distribution layer 650 value, such as 255. Although not shown in FIG. 6, in some embodiments, the layer values may be shown in accordance with the layers.

In some embodiments, the network topology architecture layer values may be defined values, such as values identified in response to input, such as user input. In some embodiments, the defined network topology architecture layer values may be adjusted based on system investigation, such as the system investigation shown at 420 in FIG. 4.

In some embodiments, whether an element of the electronic computing and communication system is in the communication path 620 may be indicated graphically, or visually. For example, elements in the communication path 620 may be shown using a color or size that differs from elements omitted from the communication path 620. As shown, elements omitted from the communication path 620 are shown as small white circles with thin borders, and elements 632/642/652/662/664/672 included in the communication path 620 are shown as small circles with thick borders.

In some embodiments, the graphical representation may indicate that one or more of the elements 632/642/652/662/664/672 included in the communication path 620 corresponds with an abnormal metric value. For example, as shown, a flag may be shown in association with one or more elements 632/642/652/662/664/672 identified as corresponding with an abnormal metric value. Although shown as black flags in FIG. 6, in some embodiments, a flags may graphically represent a corresponding metric category. For example, the flag associated with the element 632 in the Internet layer 630 may be colored orange, which may indicate that the flag is associated with a performance metric, the flag associated with the right element 662 in the distribution layer 660 may be colored yellow, which may indicate that the flag is associated with a change metric, the flag associated with the left element 664 in the distribution layer 660 may be colored blue, which may indicate that the flag is associated with a Capacity metric, and the flag associated with the element 672 in the aggregation layer 670 may be colored red, which may indicate that the flag is associated with a availability metric. In some embodiments, the graphical representation of an element may indicate whether the element is associated with an abnormal metric value. In some embodiments, the color of elements included in the communication path that are not associated with abnormal metric values may be shown in a color that differs from the color of elements included in the communication path that are associated with abnormal metric values. For example, the element 642 in the border layer 640 and the element 652 in the core layer 650, may be shown in a color, such as green, that differs from the color, such as red, of elements 632/662/664/672 included in the communication path 620 that are associated with abnormal metric values. In FIG. 6 the elements 642/652 included in the communication path 620 that are not associated with abnormal metric values are shown with light stippling and the color of elements 632/662/664/672 included in the communication path 620 that are associated with abnormal metric values are shown with heavy stippling.

Although not shown separately in FIG. 6, in some embodiments, a remediation priority may be determined for each of the elements 632/642/652/662/664/672 included in the communication path 620 based on, for example, the respective layer value and metric category value, may be determined and presented. For example, a list of the elements 632/642/652/662/664/672 included in the communication path 620 ordered by remediation priority may be presented.

In the example shown in FIG. 6, the external device 620 communicates with the service 610, via an element 632 in the Internet layer 630, which may be associated with an abnormal performance metric value. The layer value for the internet layer 630 may be 50, the metric category value for the abnormal performance metric may be 150, and the remediation priority for the element 632 in the Internet layer 630 may be, for example, a product of the layer value and the metric category value, 7500.

The communication path may traverse the network from the element 632 in the Internet layer 630 to the element 642 in the border layer 640, which may not be associated with an abnormal metric value. The layer value for the border layer 640 may be 100, a value of zero may indicate that the element 642 is not associated with an abnormal metric value, and the remediation priority for the element 642 in the border layer 640 may be 0.

The communication path may traverse the network from the element 642 in the border layer 640 to the element 652 in the core layer 650, which may not be associated with an abnormal metric value. The layer value for the core layer 650 may be 150, a value of zero may indicate that the element 652 is not associated with an abnormal metric value, and the remediation priority for the element 652 in the core layer 650 may be 0.

The communication path may traverse the network from the element 652 in the core layer 650 to the right element 662 in the distribution layer 660, which may which may be associated with an abnormal change metric value. The layer value for the distribution layer 660 may be 200, the metric category value for the abnormal change metric may be 200, and the remediation priority for the right element 662 in the distribution layer 660 may be 40000.

The communication path may traverse the network from the right element 662 in the distribution layer 650 to the left element 664 in the distribution layer 660, which may which may be associated with an abnormal capacity metric value. The layer value for the distribution layer 660 may be 200, the metric category value for the abnormal capacity metric may be 100, and the remediation priority for the left element 664 in the distribution layer 660 may be 20000.

The communication path may traverse the network from the left element 654 in the distribution layer 660 to the element 672 in the aggregation layer 670, which may which may be associated with an abnormal availability metric value. The layer value for the aggregation layer 670 may be 255, the metric category value for the abnormal availability metric may be 255, and the remediation priority for the element 672 in the aggregation layer 670 may be 65025.

The elements may presented in remediation priority order with the element 672 in the aggregation layer 670, having the highest remediation priority, first, followed by the right element 662 in the distribution layer 660, the left element 664 in the distribution layer 660, the element 632 in the Internet layer 630, the element 642 in the border layer 640, and the element 652 in the core layer 650.

The implementations of the electronic computing and communication system including clients 112/114/122/124 and servers 132/134/142/144 (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of clients 112/114/122/124 and servers 132/134/142/144 are not necessarily implemented in the same manner.

Further, in an embodiment, for example, clients 112/114/122/124 and servers 132/134/142/144 can be implemented using a special purpose computer/processor, which can contain specialized hardware for carrying out any of the methods, algorithms, or instructions described herein.

Further, all or a portion of embodiments of the present invention can be implemented using a special purpose computer/processor with a computer program that, when executed, carries out any of the respective techniques, algorithms and/or instructions described herein, and which can contain specialized hardware for carrying out any of the techniques, algorithms, or instructions described herein.

Implementations or portions of implementations of the above disclosures can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein. As used herein, the terminology "generating", or any variations thereof, includes combining, calculating, computing, aggregating, rendering, laying out, drawing, or otherwise producing in any manner whatsoever using one or more of the devices shown and described herein. As used herein, the terminology "automatic", "automatically", "automated", or any variation thereof, including use of the prefix "auto-", includes initiating or executing by one or more of the devices shown and described herein without human intervention. As used herein, the terminology "cardinality" includes a number or count of elements or items in a set, group, plurality, or any other collection of zero or more elements. As used herein, the terminology "receiving" includes receiving via a network, retrieving from memory, or otherwise ascertaining the identified information.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method of analyzing events, the method comprising:
   receiving an indication of an event in an electronic computing and communication system comprising a plurality of elements;
   identifying an element of the plurality of elements of the electronic computing and communication system corresponding to the event, wherein the element is associated with a network layer role corresponding to a network layer;
   determining a value for a metric for the element of the electronic computing and communication system;
   based on the value being an abnormal value, generating a remediation priority for the element based at least in part on a metric weight associated with the metric; and
   remediating the event based at least in part on the remediation priority.

2. The method of claim 1, wherein receiving the indication of the event comprises receiving the indication via a message, a notification, or signal.

3. The method of claim 1, wherein the event affects one or more network communication layers.

4. The method of claim 3, wherein the one or more communication layers comprises a network layer event or a host layer event.

5. The method of claim 1, wherein the event corresponds to a failed or affected service.

6. The method of claim 5, wherein the failed or affected service comprises a data storage service, data manipulation service, presentation service, a communication service, e-mail service, printing service, network file system, directory services, file sharing service, instant messaging service, video telephony service, world wide web service, time service.

7. The method of claim 5 comprising categorizing the metric based on the failed or affected service.

8. The method of claim 1, wherein the metric is identified based at least in part on historical data or a metric value stored in memory.

9. The method of claim 1 comprising investigating the electronic computing and communication system in response to receiving the event to analyze the event using the metric.

10. The method of claim 9, wherein investigating the electronic computing and communication system comprises examining configuration changes in one or more of the plurality of elements.

11. The method of claim 9, wherein investigating the electronic computing and communication system comprises examining availability of the element.

12. The method of claim 9, wherein investigating the electronic computing and communication system comprises identifying performance of the element.

13. The method of claim 9, wherein investigating the electronic computing and communication system comprises identifying capacity usage of the element.

14. The method of claim 1 comprising generating a computer-readable representation of the electronic computing and communication system using automated topology enumeration, wherein the computer-readable representation represents the plurality of elements of the electronic computing and communication system organized in a hierarchical plurality of network layers.

15. Non-transitory, computer-readable, and tangible medium storing instructions thereon configured to cause one or more processors to:

receive an indication of an incident occurring in an electronic computing and communication system, wherein the indication is generated at a network layer or a host layer;

using an enumerated network topology, generate a list of network elements that are potentially affected by the event;

collect a series of metrics for a plurality of categories for the list of network elements;

flag possible issues for analysis;

generate a remediation priority list of the list of network elements based at least in part on a metric weight associated with each of the metrics of the series of metrics; and remediating at least one of the network elements based at least in part on the remediation priority list.

16. The non-transitory, computer-readable, and tangible medium of claim 15, wherein the instructions are configured to cause the one or more processors to generate a computer-readable representation of the electronic computing and communication system using automated topology enumeration.

17. The non-transitory, computer-readable, and tangible medium of claim 16, wherein the representation represents the network elements organized in a hierarchical plurality of network layers.

18. The non-transitory, computer-readable, and tangible medium of claim 16, wherein the instructions are configured to cause the one or more processors are to generate the automated topology enumeration by:

identifying a network layer role associated with each of the network elements; and identifying a network layer associated with each of the network elements based on the corresponding network layer role.

19. The non-transitory, computer-readable, and tangible medium of claim 18, wherein the instructions are configured to cause the one or more processors to identify the network layer role by:

identifying information representing the network elements; and determining each corresponding network layer role by evaluating a configuration management database based on the information representing a respective network element of the network elements.

20. The non-transitory, computer-readable, and tangible medium of claim 15, wherein the instructions are configured to cause the one or more processors to identify network protocol information for each network element, wherein the instructions are configured to cause the one or more processors to identify network protocol information for a respective network element of the network elements that indicates a physical connection between the respective network element and another element of the electronic computing and communication system.

* * * * *